United States Patent [19]
Mutter et al.

[11] Patent Number: 5,483,221
[45] Date of Patent: Jan. 9, 1996

[54] SEAT BELT USAGE INDICATING SYSTEM

[75] Inventors: Douglas R. Mutter, Dearborn Heights; Peter Langer, Troy; Payal Agarwal, Farmington Hills, all of Mich.

[73] Assignee: Ford Motor Company, Dearborn, Mich.

[21] Appl. No.: 150,315

[22] Filed: Nov. 12, 1993

[51] Int. Cl.⁶ .................................................. B60R 22/00
[52] U.S. Cl. .................. 340/457.1; 340/457; 280/801.1; 200/61.58 B; 180/268
[58] Field of Search ................... 340/457, 457.1, 340/438; 280/801.1; 200/61.58 B; 180/268

[56] References Cited

U.S. PATENT DOCUMENTS

| | | | |
|---|---|---|---|
| 3,200,370 | 8/1965 | Rush | 340/457.1 |
| 3,665,385 | 5/1972 | Booth | 340/52 E |
| 3,740,711 | 6/1973 | Bell | 340/52 E |
| 3,742,448 | 6/1973 | Motz | 340/52 E |
| 3,757,293 | 9/1973 | Petersen, III | 340/52 E |
| 3,840,849 | 10/1974 | Lohr | 340/457.1 |
| 3,895,346 | 7/1975 | Assfour et al. | 340/52 E |
| 4,268,816 | 5/1981 | Matsuoka et al. | 340/457.1 |
| 4,380,751 | 4/1983 | Takada | 340/457.1 |
| 4,667,336 | 5/1987 | Best | 377/15 |
| 4,885,566 | 12/1989 | Aoki et al. | 340/457.1 |
| 5,076,609 | 12/1991 | Park | 340/457.1 |

*Primary Examiner*—John K. Peng
*Assistant Examiner*—Edward Lefkowitz
*Attorney, Agent, or Firm*—Mark L. Mollon; Roger L. May

[57] ABSTRACT

Seat belts in a vehicle are monitored, and a reminder is initiated in response to a restraint sensor indicating the engaged or nonengaged state of a seat restraint, a vehicle sensor indicating when the vehicle is in use, an annunciator controllably producing a reminder, and an electronic control controlling the annunciator. The reminder is produced when the seat restraint is in a nonengaged state after having been an engaged state while the vehicle is in use. Thus, monitoring of the continued buckling of a seat belt, especially a rear seat belt, is provided without need for seat occupancy sensors.

10 Claims, 2 Drawing Sheets

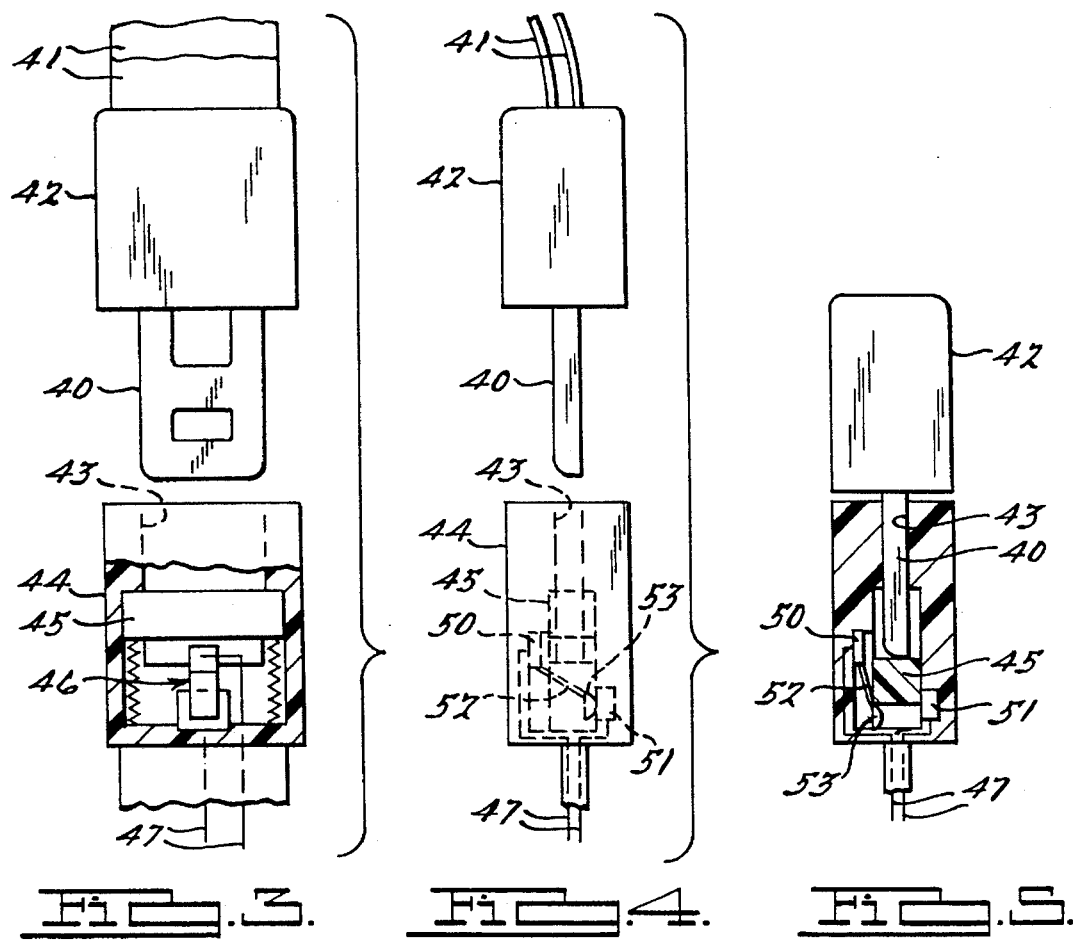
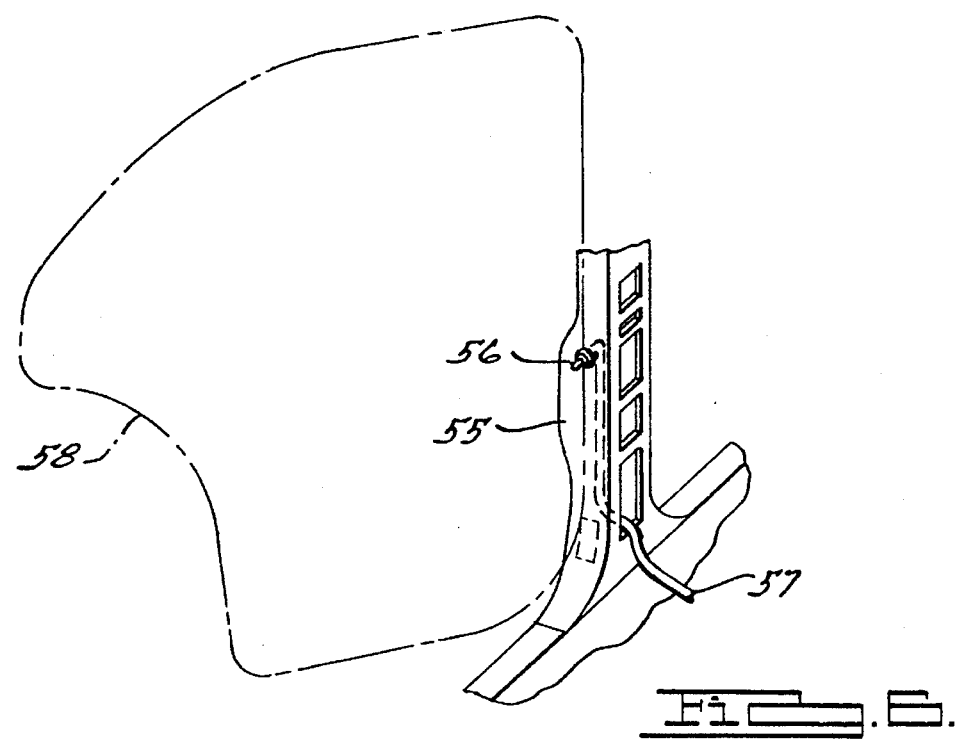

SEAT BELT USAGE INDICATING SYSTEM

BACKGROUND OF THE INVENTION

The present invention relates in general to automotive restraint systems, and more specifically to a system for monitoring seat belt use.

Active restraints, such as seat belts, require each vehicle occupant to manually engage his or her seat belt. The engaged state of seat belts is often electrically monitored, and reminder signals are given when an occupant fails to engage their seat belt.

Since a reminder is useful only when a particular seat belt is disengaged and the respective seat is actually occupied, typical prior art systems use seat occupancy sensors to determine the presence of an occupant in a particular seat. Such sensors typically comprise a load-responsive electrical switch installed within the seat. These prior art systems also require special seat construction and wiring.

In view of the wide acceptance and use of seat belts, especially by drivers, and the practice of many drivers to insure that all passengers are buckled up before driving, it is very useful to know if a seat belt becomes disconnected or disengaged during driving. The driver cannot easily monitor the seat belt use of passengers, especially rear seat passengers, during driving since his/her attention is directed to the act of driving. However, due to reconfigurable seating arrangements, specialized seats, and other seat packaging issues, rear seat occupancy sensors are sometimes not available.

SUMMARY OF THE INVENTION

The present invention advantageously monitors seat belts, especially rear seat belts, for disconnection or disengagement during driving in a manner not requiring occupancy sensors.

This and other advantages are achieved by a monitoring and reminder system for a seat restraint in a vehicle comprising a restraint sensor generating a restraint signal indicative of the engaged or nonengaged state of the seat restraint. A vehicle sensor generates a use signal when the vehicle is in use. An annunciator controllably produces a reminder. An electronic control is coupled to receive the restraint signal and the use signal and is coupled to the annunciator to control production of the reminder when the seat restraint is in a nonengaged state after having been in an engaged state while the vehicle is in use.

BRIEF DESCRIPTION OF THE DRAWINGS

FIG. 3 is a front plan and sectional view of a seat belt mechanism according to the present invention.

FIG. 4 is a side view of the seat belt mechanism of FIG. 3 prior to engagement.

FIG. 5 is a side plan and sectional view of the seat belt mechanism after engagement.

FIG. 6 is a perspective view showing installation of a door ajar switch.

DETAILED DESCRIPTION OF PREFERRED EMBODIMENTS

Figure 1:
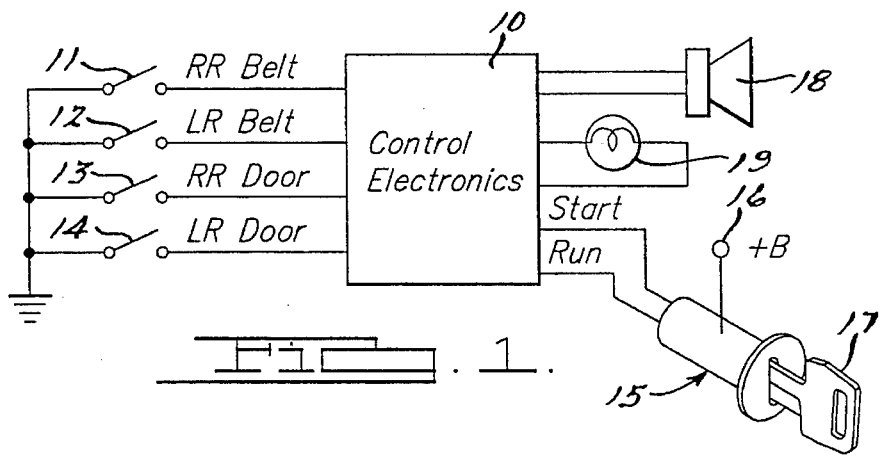
FIG. 1 is a schematic diagram showing a preferred implementation of the present invention.

The seat belt monitoring system for a vehicle such as an automobile includes control electronics 10 shown in FIG. 1. A plurality of sensors including a right rear belt sensor 11, left rear belt sensor 12, right rear door ajar sensor 13, and left rear door ajar sensor 14 are coupled to control electronics 10 and to a reference potential such as ground. An ignition switch 15 receives battery voltage +B at a terminal 16. Ignition switch 15 is part of an ignition lock mechanism controlled by a key 17. Ignition switch 15 has at least accessory, off, run, and start positions. Control electronics 10 is connected to ignition switch 15 to receive an "in use" signal when ignition switch 15 is in either the run position or the start position. Based on the foregoing input signals, control electronics 10 determines whether conditions exist in which a reminder should be issued indicating the disengagement of a seat belt while the vehicle is in use. The reminder is provided using an annunciator comprising a speaker 18 and/or an indicator light 19 connected to control electronics 10.

Figure 2:
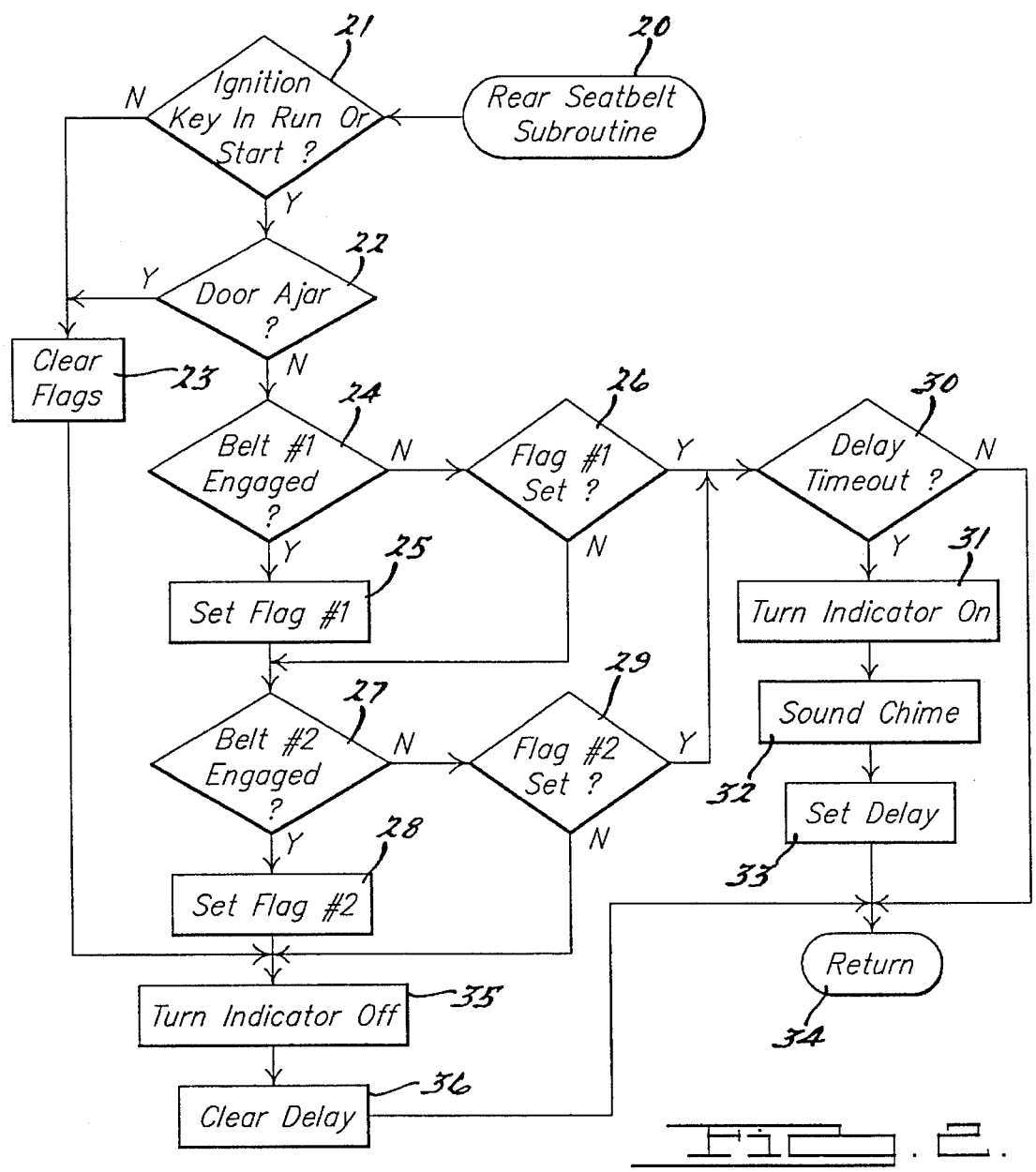
FIG. 2 is a flow chart showing operation of the system of FIG. 1.

The operation of the system shown in FIG. 1 will be described in greater detail with reference to the flow chart in FIG. 2. A rear seat belt subroutine is one of many separate subroutines called and executed by a microcontroller (not shown) within control electronics 10. In other words, control electronics 10 is part of a multi-function module including other input and output signals (not shown). The rear seat belt subroutine is repeatedly called by the microcontroller, and preferably is executed at least several times each second. The subroutine is entered at step 20. In step 21, a test is made to determine whether the ignition key is in the run or start positions, i.e., whether the vehicle is in use. If the vehicle is in use, then a test is conducted in step 22 to determine whether a door is ajar (i.e., open). If no door is ajar, the flow chart proceeds to step 24. If either the ignition key is not in the run or start position or a door is ajar, a set of flags (described below) is cleared in step 23. Thus, no reminder is issued and step 24 is not reached in the event that either the ignition key is off or in the accessory position or a door is open since no seat belt monitoring is required during these times.

In step 24, a check is made to determine if a first seat belt, belt #1, is engaged. If the belt is engaged, then a flag #1 is set in step 25. If belt #1 is not engaged, then a check is made in step 26 to determine whether flag #1 was previously set (i.e., if belt #1 had been previously engaged). If flag #1 was not set, then a check is made in step 27 to determine whether a second belt, belt #2, is engaged. If belt #2 is engaged, then a flag #2 is set in step 28. Otherwise, a check is made in step 29 to determine whether flag #2 was previously set. If flag #2 is not set, then a reminder indicator (e.g., light 19 in FIG. 1) is turned off in step 35; a delay (described below) is cleared in step 36; and the rear seat belt subroutine is exited in step 34.

If it is determined in step 26 or 29 that the respective flag is set, then a check is made in step 30 to determine whether the delay has expired (i.e., timed out). If the delay has timed out, then the reminder indicator is turned on in step 31, a reminder sound or chime is activated in step 32 for a predetermined period, and the delay period is initiated in step 33; followed by a return from the rear seat belt subroutine in step 34. The delay in step 33 provides a short period of silence between sounding of the chime. If the delay has not timed out in step 30, then the subroutine immediately returns in step 34. In a preferred embodiment of the invention, the chime is sounded in step 32 for about seven seconds and a delay between soundings of the chime is set to about three minutes.

A number of belt flags other than two can be employed in the present invention. The number of flags preferably corresponds to the number of seat belts (front or rear) being monitored.

In operation, flag #1 and flag #2 indicate whether the respective seat belt has been engaged since the ignition key has been in the run or start position or since the doors have last been closed. Thus, it is assumed that whenever the ignition key is turned off or a door is opened, the flags should be cleared (i.e., the driver has the opportunity to make sure that all seat belts are properly engaged or disengaged). In steps 26 and 29, if a respective seat belt is not now engaged but its respective flag has previously been set, then the seat belt was previously in an engaged state during the current driving cycle and the reminder should be initiated.

The reminder includes an indicator light which is turned on continuously and a reminder sound or chime which is periodically turned on for brief periods separated by delay intervals. In steps 35 and 36 when the sensed conditions again indicate that no reminder is needed, the indicator is turned off immediately and the delay period is cleared or set to zero so that the next reminder can begin immediately after the corresponding conditions are sensed.

FIG. 3 shows a seat belt latching mechanism for determining the engaged or disengaged state of the seat belt. Tongue 40 is joined with a seat belt webbing 41 inside a cover 42. A slot 43 is provided in buckle 44 for receiving tongue 40. A spring-loaded sliding bar 45 is contained within buckle 44 for contacting tongue 40 during its insertion.

Upon insertion of tongue 40, sliding bar 45 is forced into contact with a switch 46 in buckle 44. A pair of leads 47 is connected to switch 46 for providing a signal that indicates the position of switch 46 as determined by the engaged or disengaged condition of tongue 40 in buckle 44. As shown in FIG. 4, switch 46 is preferably comprised of a normally closed switch including a terminal 50 and a terminal 51 connected to leads 47. A spring contact 52 is fixed to terminal 50 and has a rounded tip 53 which normally contacts terminal 51. When tongue 40 is inserted into buckle 44, as shown in FIG. 5, tongue 40 is engaged by a latching mechanism (not shown) at the full insertion point. Simultaneously, sliding bar 45 is forced into spring contact 52 whereby rounded tip 53 is disengaged from terminal 51 thereby opening the switch.

FIG. 6 illustrates a preferred embodiment of a door ajar sensor switch 56 rotated in a door frame 55 and connected to the control electronics via a wiring cable 57. Switch 56 is responsive to movement of door 58 to provide the door ajar signal.

What is claimed is:

1. A monitoring and reminder system for a manual seat restraint in a vehicle, wherein said manual seat restraint is manually engaged and disengaged by a vehicle occupant, comprising:

a restraint sensor generating a restraint signal indicative of an engaged state or a nonengaged state of said manual seat restraint;

a vehicle sensor generating an in-use signal when said vehicle is in use;

an annunciator for producing a reminder; and an electronic control coupled to receive said restraint signal and said in-use signal and coupled to said annunciator to produce said reminder if said in-use signal is present and said restraint signal changes from indicating that said manual seat restraint is in said engaged state to indicating that said manual seat restraint is in said nonengaged state, wherein said electronic control includes a delay timer and wherein said reminder is generated periodically until said restraint signal again indicates that said manual seat restraint is in said engaged state.

2. The system of claim 1 further comprising a door position sensor mounted proximate to a door of said vehicle, wherein said electronic control clears said engaged state when said door position sensor indicates that said door has opened.

3. The system of claim 1 wherein said seat restraint is comprised of a seat belt and buckle and wherein said restraint sensor is comprised of a switch responsive to engagement of said buckle.

4. The system of claim 1 wherein said annunciator is comprised of an audible tone generator.

5. The system of claim 1 wherein said annunciator is comprised of an indicator light.

6. A method for monitoring a manual seat restraint in a vehicle using a microprocessor with a memory, wherein said manual seat restraint is manually engaged and disengaged by a vehicle occupant, said method comprising the steps of:

detecting an engaged state or nonengaged state of said manual seat restraint;

setting a flag in said memory to indicate whether said engaged state has been detected;

periodically checking whether said flag is set or not;

annunciating a reminder when said flag is set and said nonengaged state is detected, and terminating said reminder when said engaged state is detected.

7. The method of claim 6 further comprising the steps of:

initiating a predetermined delay period after annunciating said reminder for a predetermined time; and inhibiting said reminder during said predetermined delay period.

8. The method of claim 6 further comprising the steps of:

detecting either an open position or closed position of a door of said vehicle; and clearing said flag when said open door is detected.

9. The method of claim 6 further comprising the steps of:

detecting an off position or a run position of an ignition switch of said vehicle; and clearing said flag when said off position is detected.

10. The method of claim 6 wherein a plurality of individual seat restraints are monitored and wherein a plurality of flags respectively indicate the engaged or nonengaged state of a respective individual seat restraint.

* * * * *